UNITED STATES PATENT OFFICE.

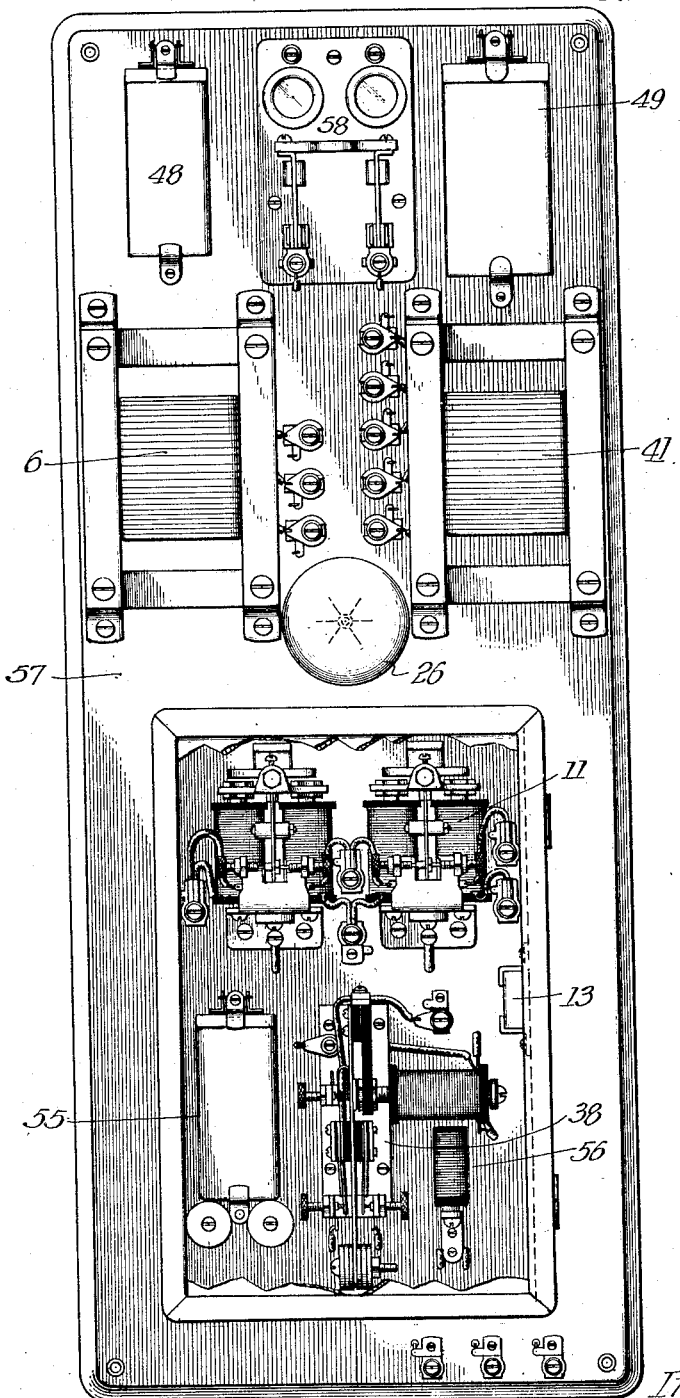

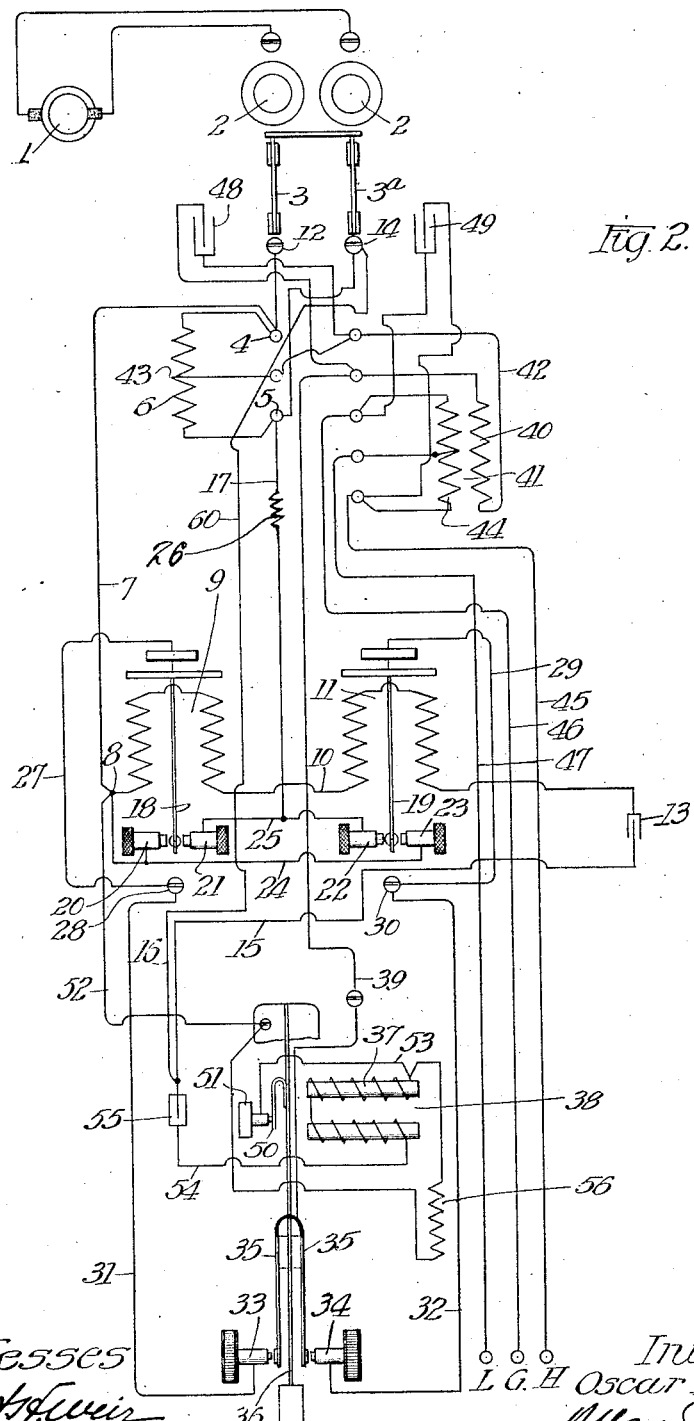

OSCAR M. LEICH, OF GENOA, ILLINOIS, ASSIGNOR TO LEICH ELECTRIC COMPANY, OF GENOA, ILLINOIS.

VIBRATORY CONVERTER.

1,292,815.   Specification of Letters Patent.   Patented Jan. 28, 1919.

Application filed September 28, 1915. Serial No. 52,995.

*To all whom it may concern:*

Be it known that I, OSCAR M. LEICH, a citizen of the United States, residing at Genoa, in the county of DeKalb and State of Illinois, have invented a certain new and useful Improvement in Vibratory Converters, of which the following is a full, clear, concise, and exact description, reference being had to the accompanying drawings, forming a part of this specification.

My invention relates to vibratory converters, and has for its object the provision of an improved converter of this kind which is an improvement more particularly of my co-pending application Serial No. 16,564, filed March 24, 1915. My invention contemplates in its general form the provision of a mechanism which can be supplied with alternating current, change this alternating current into uni-directional current, and then modify this uni-directional current into an alternating current of a different frequency than the impressed alternating current.

My invention is particularly designed for use in connection with twin vibrators for use in transforming alternating current into pulsating current. When using but one vibrator in connection with instrumentalities such as this and as shown in my co-pending application Serial No. 16,564, a differentially wound transformer is required as set forth in said co-pending application. To avoid the use of this differentially wound transformer I utilize twin vibrators so that an ordinary style of transformer can be used, thus extremely simplifying the construction and making the operation more uniform.

In a specific form in which my invention finds much application, such as providing ringing mechanism for telephone exchanges, this mechanism may be directly connected to the commercial form of alternating current, and will transform this current into alternating current of a suitable frequency for ringing purposes.

In a co-pending application Serial No. 169,637, filed May 19, 1917, which is a division of this application, I claim in combination the system using the twin rectifier vibrators and the pole changer vibrator, the claims of this application being confined to the rectifier vibrators and their connections.

In illustrating my invention I have chosen this particular form, and it is this particular form I will now describe in connection with the accompanying drawings illustrating such form, in which—

Figure 1 is a front view of a vibratory converter constructed in accordance with my invention, and Fig. 2 sets forth the circuit arrangements.

Referring more particularly to Fig. 2, I show a source of alternating current 1 which is led through fuses 2 by means of the switch bars 3 and 3$^a$ to terminals 12 and 14. To terminal 12 is connected terminal 4 of the impedance coil 6, and terminal 14 is connected through a resistance 26, preferably a lamp, to terminal 5 of the impedance coil 6. A circuit extends from the binding post 4 by means of the conductor 7, to one terminal 8 of a vibrator 9, the current then extending through the coils of said vibrator by means of conductor 10, through the coils of the twin vibrator 11, condenser 13, conductor 15, conductor 16, conductor 60, to the terminal 14. Twin vibrators 9 and 11 are thus also connected directly across the circuit from the generator 1. These twin vibrators 9 and 11 vibrate their armatures and consequently the arms 18 and 19 respectively in accordance with the frequency of the current supplied by the generator 1, the condenser 13 serving to cause the current breaks due to these vibrations to occur at the proper time, that is, when the current is passing through its zero point. The arm 18 coöperates respectively with the contacts 20 and 21, and the arm 19 coöperates respectively with the contacts 22 and 23. The contacts 20 and 23 are connected together by means of the conductor 24, which then extends by way of conductor 7 to the terminal 4, which is one side of the impressed circuit. The contacts 21 and 22 are connected together by means of a conductor 25, and this conductor 25 is connected by the conductor 17 to the terminal 5, which represents the other side of the impressed circuit. The conductor 17 has a resistance 26 included in circuit therewith. It has been found in the operation of twin vibrators that at times there may be some inequalities in the operation of the arms 18 and 19, these arms momentarily being out of step, thus making a momentary wrongful contact. Under these circumstances a too large flow of current would cause the welding of the contacts and destroy the instrument. The resistance 26 serves the purpose of protecting both of the twin vibrators. The arm 18 is connected by means of conductor 27 with the contact terminal 28, and the arm 19 is connected by means of conductor 29 to the contact terminal 30.

We thus have at the contact terminals 28 and 30 a uni-directional current as the arms 18 and 19 vibrate in accordance with the frequency of the impressed current, and thus keep the terminals 28 and 30 positive and negative respectively. These terminals 28 and 30 are then connected by means of conductors 31 and 32 respectively to the contact posts 33 and 34. These contact posts are in association with spring contacts 35, 35, carried by a vibrating rod 36 which is operable by the electromagnet 37 of the vibrator 38. The arms 35 are connected together and extend by means of conductor 39 to one terminal of a primary winding 40 of the transformer 41, the other terminal of this primary winding being connected by means of conductor 42 with a central point 43 of the impedance winding 6. Thus we have alternating current established in the primary winding 40 of a frequency corresponding to the vibrations of the vibratory arm 36. A secondary winding 44 is in inductive relation with the primary winding 40 and furnishes its full voltage to the conductors 45 and 46. A conductor 47 is taken from an intermediate portion of the secondary winding 44 so that the conductor marked G may represent the conductor that is always used from this secondary winding for the local circuit, and the conductors marked L and H can be used for a low or high voltage as desired. The terminals of the primary winding 40 are bridged by the condenser 48 to smooth out the wave, and the terminals of the secondary winding are bridged by the condenser 49 for a similar purpose. The vibrator 38 has a contact spring 50 which coöperates with the stationary contact 51. The current to operate the vibrator 38 is furnished from the main circuit supplied by the generator 1, and can be traced from the binding post 4, via conductor 7, conductor 52, arm 36, contact elements 50 and 51, conductor 53, coils 37, conductor 54, condenser 55, conductor 16, to the terminal 14. Whenever the arm 36 is attracted and circuit through the elements 50 and 51 broken, the circuit is not entirely broken through the coils 37 as they are still included with the resistance 56, but that does not energize them sufficiently to prevent retraction of the armature 36.

The lamp 26 it will be seen is directly in circuit and prevents difficulty even if the machine does not operate properly due to a temporary variation in the positions of the elements 18 and 19. I am thus enabled to obtain an alternating current of a modified frequency from that of the impressed alternating current. The twin vibrators 9 and 11 serve to control the actuations a great deal better than if a single vibrator with a plurality of contacts is used, as the elements 18 and 19 must readily respond to the current to attain the best results.

The parts mentioned in this connection are all mounted on a suitable base plate 57 as shown in Fig. 1, the fuse and switch devices being mounted upon a switch base 58. The remaining parts can be readily identified. It will thus be seen that a self-contained panel, including all of the elements to provide a device of that character is herein disclosed.

From what has been described the nature of my invention will be readily clear to those skilled in the art, and it will also be clear that my invention is susceptible of modifications within the scope of the appended claims.

Having however thus described one form of my invention, what I claim as new and desire to secure by Letters Patent is:

1. A current modifying system of the character described comprising a source of alternating current, a pair of twin vibrators vibrating in synchronism with the alternations of said alternating current, a consumption circuit to which said vibrators are adapted to supply uni-directional current, each of said vibrators having a vibratory element, said elements representing each to each different polarities, and means for preventing the establishment of a short circuit across said source of alternating current upon improper actuation of said elements.

2. A current modifying system of the character described comprising a source of alternating current, a pair of twin vibrators vibrating in synchronism with the alternations of said alternating current, a consumption circuit to which said vibrators are adapted to supply uni-directional current, each of said vibrators having a vibratory element, said elements representing each to each different polarities, and a resistance interposed between said vibrators and said source for preventing the establishment of a short circuit across said source of alternating current upon improper actuations of said elements.

3. A current modifying system of the character described comprising a source of alternating current, a pair of twin vibrators vibrating in synchronism with the alternations of said alternating current, a consumption circuit to which said vibrators are adapted to supply uni-directional current, each of said vibrators having a vibratory element and coöperating contacts, said elements representing each to each different polarities, and a resistance interposed between said contacts and said source to prevent the establishment of a short circuit across said source of alternating current upon improper actuations of said elements.

4. A current modifying system of the character described comprising a source of alternating current, a pair of twin vibrators vibrating in synchronism with the alternations of said alternating current, a consumption circuit to which said vibrators are adapted to supply uni-directional current, each of said vibrators having a vibratory element and coöperating contacts associated with the opposite sides of said source of alternating current, said elements representing each to each different polarities, and a resistance interposed between said contacts and said source to prevent the establishment of a short circuit across said source of alternating current upon improper actuations of said elements.

5. A current modifying system of the character described comprising a source of alternating current, a vibrator vibrating in synchronism with the alternations of said alternating current, a consumption circuit to which said vibrator is adapted to supply uni-directional current, said vibrator having a vibratory element and coöperating contacts, said contacts being connected to opposite polarities of said source of alternating current, and a resistance in series with one of said contacts to prevent the establishment of a short circuit across said source of alternating current upon improper actuation of said vibratory element.

6. A current modifying system of the character described comprising a source of alternating current, a vibrator vibrating in synchronism with the alternations of said alternating current, a consumption circuit to which said vibrator is adapted to supply uni-directional current, said vibrator having a vibratory element and coöperating contacts, said contacts being connected to opposite polarities of said source of alternating current, said vibratory element comprising in part a flat strip and said contacts being mounted on opposite sides of said flat strip, and a resistance in series with one of said contacts to prevent the establishment of a short circuit across said source of alternating current upon improper actuation of said vibratory element.

In witness whereof, I hereunto subscribe my name this 24th day of September, A. D., 1915.

OSCAR M. LEICH.

Witnesses:
O. M. WERMICH,
HAZEL A. JONES.

Copies of this patent may be obtained for five cents each, by addressing the "Commissioner of Patents, Washington, D. C."